US010015195B2

(12) United States Patent
Stählin et al.

(10) Patent No.: US 10,015,195 B2
(45) Date of Patent: Jul. 3, 2018

(54) METHOD AND SYSTEM FOR THE DISTRIBUTED TRANSMISSION OF A COMMUNICATION FLOW AND USE OF THE SYSTEM

(71) Applicant: Continental Teve AG & Co. oHG, Frankfurt (DE)

(72) Inventors: Ulrich Stählin, Eschborn (DE); Richard Scherping, Dortmund (DE)

(73) Assignee: CONTINENTAL TEVES AG & CO. OH, Frankfurt (DE)

( * ) Notice: Subject to any disclaimer, the term of this patent is extended or adjusted under 35 U.S.C. 154(b) by 312 days.

(21) Appl. No.: 14/347,801

(22) PCT Filed: Sep. 28, 2012

(86) PCT No.: PCT/EP2012/069258
§ 371 (c)(1),
(2) Date: Mar. 27, 2014

(87) PCT Pub. No.: WO2013/045657
PCT Pub. Date: Apr. 4, 2013

(65) Prior Publication Data
US 2014/0307628 A1    Oct. 16, 2014

(30) Foreign Application Priority Data

Sep. 29, 2011  (DE) .......................... 10 2011 083 773
Sep. 14, 2012  (DE) .......................... 10 2012 216 392

(51) Int. Cl.
*H04L 29/06*  (2006.01)
*G08G 1/01*  (2006.01)
(Continued)

(52) U.S. Cl.
CPC ............. *H04L 63/18* (2013.01); *G08G 1/0112* (2013.01); *G08G 1/163* (2013.01); *G08G 1/164* (2013.01);
(Continued)

(58) Field of Classification Search
CPC ......... H04L 63/18; H04L 47/10; H04L 47/34; H04L 49/256; H04L 67/12; H04L 69/166;
(Continued)

(56) References Cited

U.S. PATENT DOCUMENTS 5,732,387 A * 3/1998 Armbruster .......... H04B 7/1855
                                                          342/352
8,116,213 B2 * 2/2012 Krygowski ................... 370/248
(Continued)

FOREIGN PATENT DOCUMENTS

CN    101484779 A    7/2009
DE    101 40 446 A1    3/2003
(Continued)

OTHER PUBLICATIONS

PCT International Search Report—dated Jan. 17, 2013.
German Examination Report—dated Nov. 2, 2012.

*Primary Examiner* — Hassan Kizou
*Assistant Examiner* — Roberta A Shand
(74) *Attorney, Agent, or Firm* — Brinks Gilson & Lione

(57) ABSTRACT

A method and system for the distributed transmission of the communication flow, in which the communication flow takes place at least unidirectionally from a first to a second communication unit and wherein the first and second communication units are capable of transmitting the communication flow by means of at least two different communication paths, the communication flow comprises at least one vehicle-to-X message. The communication flow is divided into at least two communication flow elements by the first
(Continued)

communication unit prior to sending, wherein the at least two communication flow elements are transmitted from the first to the second communication unit in a manner distributed over the at least two different communication paths, and wherein the at least two communication flow elements are assembled again by the second communication unit following reception.

11 Claims, 2 Drawing Sheets

(51) Int. Cl.
| | | |
|---|---|---|
| G08G 1/16 | (2006.01) | |
| H04L 12/707 | (2013.01) | |
| H04L 29/08 | (2006.01) | |
| H04W 4/12 | (2009.01) | |
| H04W 12/10 | (2009.01) | |
| H04W 4/04 | (2009.01) | |
| H04W 12/12 | (2009.01) | |
| H04W 4/80 | (2018.01) | |

(52) U.S. Cl.
CPC ............ *H04L 45/24* (2013.01); *H04L 67/12* (2013.01); *H04W 4/12* (2013.01); *H04L 63/123* (2013.01); *H04L 63/1441* (2013.01); *H04W 4/046* (2013.01); *H04W 4/80* (2018.02); *H04W 12/10* (2013.01); *H04W 12/12* (2013.01)

(58) Field of Classification Search
CPC . H04L 69/16; H04L 69/14; H04L 2012/5652; H04W 12/10
See application file for complete search history.

(56) References Cited

U.S. PATENT DOCUMENTS

| 8,671,277 | B2* | 3/2014 | Xu et al. ................ 713/168 |
| 9,148,767 | B2* | 9/2015 | Bakker et al. |
| 2002/0101848 | A1* | 8/2002 | Lee et al. ............... 370/349 |
| 2003/0126303 | A1* | 7/2003 | Kadakia ............ H04L 63/0442 719/313 |
| 2004/0010472 | A1* | 1/2004 | Hilby ................ G06Q 20/3674 705/67 |
| 2004/0013192 | A1 | 1/2004 | Kennedy |
| 2005/0060295 | A1* | 3/2005 | Gould et al. ................. 707/3 |
| 2008/0243990 | A1* | 10/2008 | Mallik et al. ............... 709/203 |
| 2010/0149968 | A1 | 6/2010 | Reinold |
| 2012/0042032 | A1* | 2/2012 | Fredette et al. ............ 709/214 |

FOREIGN PATENT DOCUMENTS

| DE | 10 2005 023 322 A1 | 11/2006 |
| DE | 10 2007 030 430 A1 | 2/2008 |
| DE | 10 2011 077 998 A1 | 1/2012 |
| DE | 10 2011 079 052 A1 | 3/2012 |
| EP | 0 993 142 A1 | 4/2000 |
| EP | 1 528 732 A1 | 5/2005 |
| EP | 1 995 933 A1 | 11/2008 |
| GB | 2 222 057 A | 2/1990 |
| WO | WO 2010/139806 A1 | 12/2010 |

\* cited by examiner

METHOD AND SYSTEM FOR THE DISTRIBUTED TRANSMISSION OF A COMMUNICATION FLOW AND USE OF THE SYSTEM

CROSS REFERENCE TO RELATED APPLICATIONS

This application claims priority to German Patent Application Nos. 10 2011 083 773.6, filed Sep. 29, 2011; 10 2012 216 392.1, filed Sep. 14, 2012, and PCT/EP2012/069258, filed Sep. 28, 2012.

FIELD OF THE INVENTION

The invention relates to a system and method for the distributed transmission of a communication flow.

BACKGROUND

The increasingly rapid development in the field of what are known as vehicle-to-X communication systems and the associated technologies provides a large number of novel options for reducing or even completely avoiding risks and hazard situations in road traffic. Furthermore, it is known practice to use vehicle-to-X communication systems to increase driving comfort, for example as part of a traffic light phase assistant, or else for commercial applications and for entertainment purposes for the passengers. A problem associated with this development is ensuring the necessary reliability and particularly data integrity of the transmitted vehicle-to-X information, however, since such information can be used as a basis for autonomous interventions in the vehicle control and for gaining access to essential vehicle functions. A piece of incorrect or, in the worst case, even maliciously falsified vehicle-to-X information can therefore have serious consequences and needs to be reliably identified as untrustworthy.

In this connection, DE 10 2011 077 998 A1 discloses a method for information validation for a vehicle-to-X message by means of ambient sensors. In this context, the information content of a piece of vehicle-to-X information can be reliably validated even if the ambient sensors capture the information content described by the vehicle-to-X information only for a short time or with constant interruptions. Hence, it is possible for vehicle-to-X information to be validated or rejected as not sufficiently trustworthy even in situations with only restricted ambient sensing opportunities. If the vehicle-to-X information is validated according to the method proposed in DE 10 2011 077 998 A1, it has a sufficiently high level of reliability for intervention in the vehicle control.

DE 10 2007 030 430 A1 describes a method for transmitting vehicle-relevant information in and from a vehicle. What is known as a transmission control unit is used to evaluate information received from various communication means, such as mobile radio means or WLAN means, and then to transmit it to mobile terminals carried in the vehicle. In this case, the transmission control unit may comprise a security module that allows communication and data interchange with transmitters situated outside the vehicle in secure form. In order to ensure the secure form of the data interchange, both the information to be transmitted and the information received is stored and monitored. At the same time, attacks on the outside on the information, such as an eavesdropping attempt, are fended off. In addition, the option of transmitting information in encrypted form is described.

DE 10 2011 079 052 A1 discloses a method and a system for validating a vehicle-to-X message. In this case, a wirelessly transmitted vehicle-to-X message is received by an antenna arrangement that has at least two antenna elements, wherein the electromagnetic field strength of the vehicle-to-X message is picked up by the antenna elements with different power densities on account of different, direction-dependent reception characteristics of the antenna elements. The transmitted vehicle-to-X message furthermore comprises an absolute position—based on GPS data—for the transmitter, and the receiver of the vehicle-to-X message uses its own position to calculate a first relative position for the transmitter in relation to the receiver from said absolute position. In addition, the receiver determines a second relative position for the transmitter in relation to the receiver from the ratio of the power densities picked up. A comparison of the first relative position with the second relative position can then be used to validate the received vehicle-to-X message if both positions match, or to reject it if the positions differ from one another.

The data integrity precautions or data integrity methods that are known from the prior art in connection with vehicle-to-X communication have disadvantages for various reasons, however. By way of example, vehicle-to-X messages must, as one alternative, be signed or encrypted in complex fashion on account of the high data integrity requirements, which requires comparatively powerful hardware for coding and decoding. This hardware in turn is associated with a correspondingly high level of cost involvement, which renders such methods unattractive. If resorting to checking the information content of the received vehicle-to-X messages by means of ambient sensors, a sufficient number of different types of ambient sensors is required on the vehicle in order to be able to capture as large as possible a number of different pieces of information and compare them with the information content of the received vehicle-to-X messages. In addition, the various operating principles of the communication means and of the ambient sensors, the orientation of the ambient sensors or simply the absence of ambient sensors mean that it is often not possible to check a vehicle-to-X message in this way. The use of a directionally selective antenna in turn often allows no clear inferences as to the position of the transmitter, since the electromagnetic field of the transmitted vehicle-to-X message is subject to a large number of influences on the beam path to the antenna of the receiver. This decreases the reliability and the availability of such a method.

SUMMARY AND INTRODUCTORY DESCRIPTION OF THE INVENTION

The invention is therefore based on the object of proposing a method that avoids the disadvantages that are known from the prior art.

According to the method for the distributed transmission of the communication flow, in which the communication flow takes place at least unidirectionally from a first to a second communication unit and wherein the first and second communication units are capable of transmitting the communication flow by means of at least two different communication paths, the communication flow comprises at least one vehicle-to-X message. The method is distinguished in that the communication flow is divided into at least two communication flow elements by the first communication unit prior to sending, wherein the at least two communication flow elements are transmitted from the first to the second communication unit in a manner distributed over the at least two different communication paths, and wherein the at least two communication flow elements are assembled again by the second communication unit following reception.

The method therefore leads to the advantage that the communication flow and the vehicle-to-X messages that the communication flow comprises can be protected comparatively easily against inadvertent and particularly against malicious information implantations or information alterations because the second communication unit establishes, when assembling the at least two communication flow elements, whether the at least two communication flow elements correspond to the communication flow previously divided by the first communication unit. When the at least two communication flow elements cannot be assembled to form a conflict-free or consistent joint communication flow, this is an indication that one of the communication flow elements has been inadvertently or maliciously altered. By way of example, this data inconsistency manifests itself in that the assembled communication flow describes a piece of information that can no longer be evaluated or that cannot be read. This produces a corresponding, at least internal error message that can also be output externally.

Hence, inadvertent or malicious falsification of the information content of the vehicle-to-X messages that the communication flow comprises is thus rendered more difficult insofar as the at least two communication flow elements need to be altered to the same degree and in sync in order to disguise this alteration during the assembly by the second communication unit. Since the at least two communication flow elements are furthermore transmitted in a manner distributed over at least two different communication paths, it is close to impossible to alter the at least two communication flow elements to the same degree and in sync, however.

Preferably, the first and second communication units are each capable of bidirectional communication, wherein the bidirectional communication comprises two oppositely directed unidirectional communication flows, wherein for the bidirectional communication the first and second communication units each choose different communication paths for transmitting the unidirectional communication flow, and wherein particularly for the bidirectional communication a unidirectional communication flow is not divided. This results in the advantage that the inventive method also allows secure bidirectional communication. In addition, the execution and implementation of the inventive method is simplified by virtue of a unidirectional communication flow not being divided for the bidirectional communication, since the first communication unit therefore sends on a first communication path and receives on a second communication path, while the second communication unit sends on the second communication path and receives on the first communication path. If the first and second communication units are capable of communication by means of more than two different communication paths, the communication paths used for sending and receiving can also be regularly changed, which further increases the data integrity of the communication.

In addition, it is preferred that the vehicle-to-X message comprises a useful data portion and a security data portion, wherein the security data portion comprises a checksum and/or a time stamp and/or a data integrity certificate, particularly a data integrity certificate based on a central infrastructure. In this case, the useful data portion comprises the actual information to be transmitted, for example what is known as a "CAM" (cooperative awareness message), which is protected by data engineering by the security data portion. An example of a data integrity certificate that can be used according to the invention is a data integrity certificate that is created and distributed by means of a central infrastructure, for example. A central infrastructure of this kind is also known generally as a "public key infrastructure".

In particular, it is preferred that the useful data portion and the security data portion are transmitted on different communication paths, wherein a check is performed to determine whether the security data portion can be attributed to the useful data component, and wherein the vehicle-to-X message is classified as unreliable if the security data portion cannot be attributed to the useful data portion. By checking the attributability of the useful data portion in relation to the security data portion or vice versa, it is a simple matter to establish data inconsistency, with evaluatability or readability of the useful data portion nevertheless continuing to be ensured. The classification of the vehicle-to-X message as unreliable also allows appropriate use of the vehicle-to-X message for noncritical applications, such as the output of an indication to the driver, the driver being able to check the situation on which the indication is based himself by means of his sensory perception.

Furthermore, it is preferred that the respective at least two different communication paths are used to redundantly transmit an identical communication flow element, particularly an identical useful data portion of the vehicle-to-X message. This further increases the data integrity for the communication, since a communication flow element is redundantly available on the receiving communication unit.

In particular, it is preferred that the redundantly transmitted communication flow element, particularly the redundantly transmitted useful data portion of the vehicle-to-X message, is checked for consistency, and in the event of a discrepancy the redundantly transmitted communication flow element, particularly the redundantly transmitted vehicle-to-X message, is classified as unreliable. This allows an alteration in the communication to be immediately identified by virtue of a simple consistency check on the redundantly received communication flow elements or the useful data portions of the vehicle-to-X messages. The possibly subsequent classification of the redundantly received communication flows, particularly the useful data portions of the vehicle-to-X messages, as unreliable sometimes allows appropriate use nevertheless.

With particular preference, a temporal behavior of the vehicle-to-X message transmitted in a manner distributed over the at least two different communication paths is checked for consistency, and in the event of a discrepancy the vehicle-to-X message is classified as unreliable. If discrepancies from a typical, a known, an expected or a prescribed temporal behavior arise, this may be caused by an alteration in the information content of the communication flow. A vehicle-to-X message that is classified as unreliable can then possibly still be used for noncritical uses. Variables to be considered that may be used for the consistency check on the temporal behavior may be the latencies, the time stamps or the known transmission properties of the various communication paths used, for example.

In one advantageous embodiment of the invention, position information for a communication unit sending the vehicle-to-X message is determined from reception properties of an electromagnetic wave for the vehicle-to-X message on a reception apparatus of a communication unit that receives the vehicle-to-X message, and said position information is checked for consistency with position information that the vehicle-to-X message comprises for the communication unit sending the vehicle-to-X message, and in the event of a discrepancy the vehicle-to-X message is classified as unreliable. Hence, the inventive method can be made even more secure and more reliable by using an additional check level, namely the electromagnetic reception properties of the vehicle-to-X message that the communication flow comprises. The particular advantage of this embodiment is that the position information determined from the reception properties of the electromagnetic wave of the vehicle-to-X message on the reception apparatus of the communication unit that receives the vehicle-to-X message cannot be altered by a third party. Hence, a falsification-proof variable is available for the consistency check.

In a further preferred embodiment, a reliability assessment based on communication path is made, particularly when the vehicle-to-X message has previously been classified as unreliable. This results in the advantage that graduated reliability assessment is made possible that takes account of the various communication paths and the manipulation susceptibilities thereof, which differ on a technical basis. The basis used for this assessment may be the data integrity method used on the respective communication path, for example. If the vehicle-to-X message has been classified as unreliable, the reliability assessment based on communication path can be used to judge on which communication path a redundantly transmitted component of the vehicle-to-X message has presumably been altered and which redundantly transmitted component is therefore presumably unaltered.

Furthermore, it is preferred that vehicle-to-X messages classified as unreliable are rejected unprocessed. This avoids processing an incorrect or even maliciously falsified vehicle-to-X message and thereby producing a hazard situation or fostering the production of a hazard situation.

Expediently, the at least two communication flow elements are distributed over the at least two different communication paths according to a prescribed scheme. The prescribed scheme is in this case preferably known only to the first and second communication units. With particular preference, the first communication unit transmits an appropriate piece of information about the scheme at the beginning of communication in order to change the communication paths to the second communication unit. This makes it additionally more difficult to alter or falsify a communication flow element, since the receiving communication unit expects the reception of the communication flow element via a communication path that is unforeseeable for a third party.

Furthermore, it is advantageous that the respective at least two different communication paths are at least two different communication means and/or different communication channels of one and the same communication means. The use of different communication means as different communication paths usually ensures a distinctly different behavior in the different communication paths, which is in turn associated with comparatively great difficulties for a third party to synchronously alter the transmitted communication flow. Hence, this variant embodiment is particularly secure. On the other hand, the use of different communication channels of one and the same vehicle-to-X communication means as different communication paths allows the application of the inventive method even with only simply equipped communication units that have only a single communication means.

Furthermore, the present invention relates to a system for the distributed transmission of a communication flow, which system comprises at least one first and a second communication unit that each communicate unidirectionally or bidirectionally with one another. The first and second communication units for their part each comprise communication means and by virtue of these are capable of transmitting the communication flow by means of at least two different communication paths. In addition, the first and second communication units comprise particularly consistency check means for checking for consistency between redundantly received communication flow elements and assessment means for assessing a reliability of a vehicle-to-X message that a received communication flow element comprises. The inventive system is characterized in that the first and/or the second communication unit comprise communication flow division means for dividing a communication flow into at least two communication flow elements and/or communication flow assembly means for assembling the at least two communication flow elements to form a joint communication flow, and in that the system executes the inventive method. Since the inventive method therefore comprises all the means that are necessary for executing the inventive method and executes the inventive method, this results in the advantages already described.

By way of example, the communication flow division means or communication flow assembly means used may be appropriately designed electronic circuits or microprocessors that are suitable for splitting or assembling a binary data stream according to a prescribed scheme.

Similarly, the consistency check means and the assessment means are preferably designed as an electronic circuit or microprocessor. With particular preference, the consistency check means, the assessment means, the communication flow division means and the communication flow assembly means resort to a shared microprocessor that provides sufficiently high computation capacity for all of these uses.

Preferably, a communication means communicates on the basis of at least one of the following connection types:
  WLAN link, particularly according to IEEE 802.11p,
  ISM (Industrial, Scientific, Medical band) link, particularly via a closing apparatus with radio link capability,
  Bluetooth link,
  ZigBee link,
  UWB (Ultra Wide Band) link,
  WiMax (Worldwide Interoperability for Microwave Access),
  Mobile radio link, particularly GSM, GPRS, EDGE, UMTS and/or LTE links, and
  infrared link,
wherein the mobile-radio-based communication means are particularly preferably associated with an automatic emergency call module. The listed connection types afford different advantages and disadvantages, depending on the type, wavelength and data protocol used. By way of example, WLAN links allow a high data transmission rate and fast connection setup. By contrast, ISM links afford only a relatively low data transmission rate but are outstandingly suited to data transmission around visual obstacles. Infrared links in turn likewise afford a low data transmission rate. Finally, mobile radio links are not adversely affected by visual obstacles and afford a good data transmission rate. On the other hand, the connection setup of mobile radio links is comparatively slow, however.

An automatic emergency call module is also known as an eCall module.

Furthermore, the invention relates to a use of the system for the distributed transmission of a communication flow for vehicle-to-X communication in motor vehicles.

FURTHER DESCRIPTION

Figure 1:
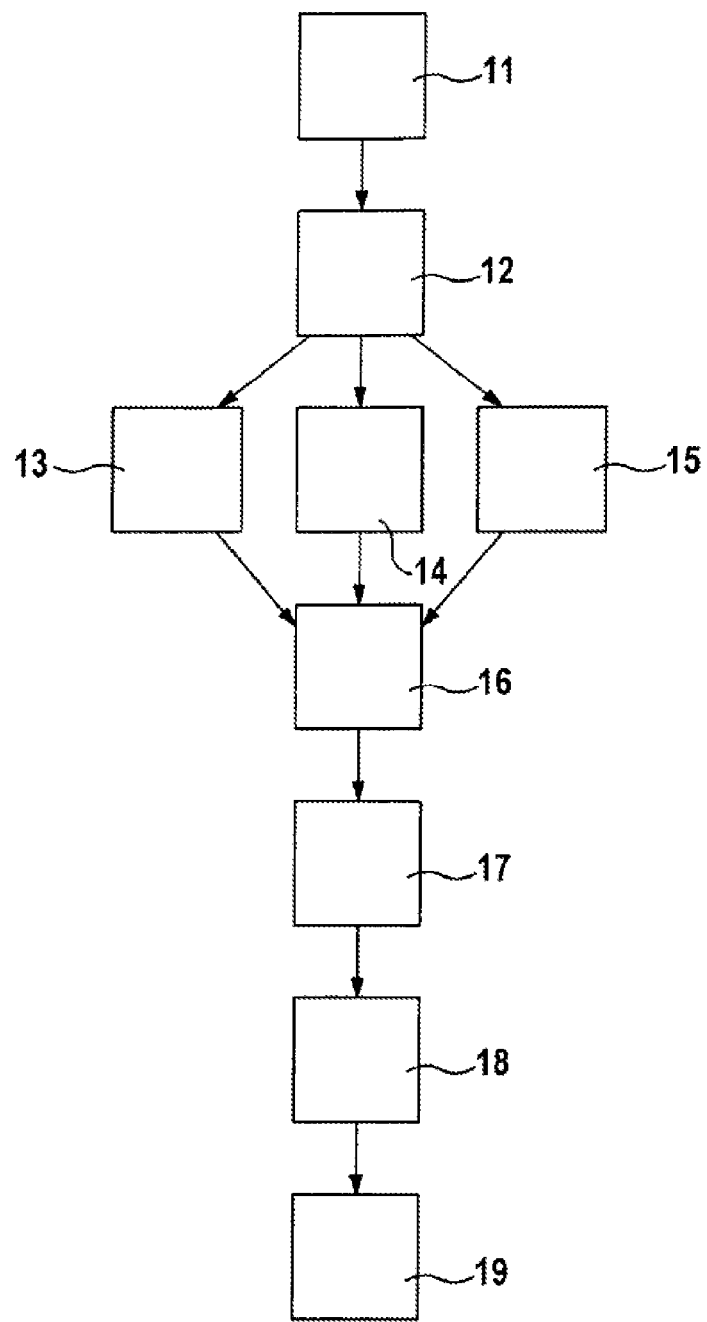
FIG. 1 illustrates a block diagram of a flowchart of the method for the distributed transmission of a communication flow.

FIG. 1 shows an exemplary illustration of an inventive method sequence in the form of a flowchart. In step 11, a first communication unit creates a communication flow that is to be sent and that comprises a multiplicity of vehicle-to-X messages. In the next step 12, the communication flow is divided into three different communication flow elements that are each transmitted independently of one another in a manner distributed over three different communication paths. The transmission of each takes place simultaneously in method steps 13, 14 and 15. In this case, a first communication flow element is transmitted by means of a WLAN link in step 13, a second communication flow element is transmitted by means of a mobile radio link in step 14 and a third communication flow element is transmitted by means of an ISM link in step 15. The vehicle-to-X messages that the three communication flow elements comprise are held to some extent redundantly in the three communication flow elements in this case. In method step 16, the three communication flow elements are received by a second communication unit, which, like the first communication unit, is capable of communication by means of WLAN communication means, mobile radio communication means and ISM communication means. In the next step 17, the redundantly contained components of the three communication flow elements are then checked for consistency with one another. Since the result of the check for consistency is that the three communication flow elements do not have any discrepancies from one another, they are assembled to form a joint communication flow in step 18. Since no data inconsistencies arise in this case and the security data portions can each be attributed to the useful data portions, it is assumed that the communication flow has not been manipulated. In step 19, the vehicle-to-X messages that the communication flow comprises are therefore forwarded to the relevant vehicle systems and processed.

Figure 2:
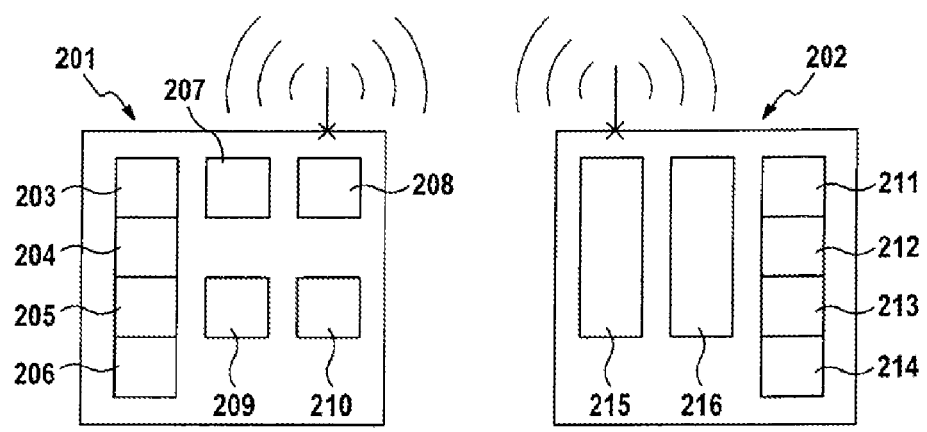
FIG. 2 shows a schematic design for system for the distributed transmission of a communication flow.

FIG. 2 shows a schematic design for an inventive system that comprises communication units 201 and 202 communicating with one another bidirectionally. Communication unit 201 in turn for its part comprises different communication means 203, 204, 205 and 206. Communication means 203 are WLAN communication means according to IEEE 802.11p, communication means 204 are UMTS-capable mobile radio communication means, communication means 205 are ISM communication means and communication means 206 are WiMax communication means. Furthermore, communication unit 201 comprises consistency check means 207 for checking for consistency in redundantly received communication flow elements and assessment means 208 for assessing a reliability of a vehicle-to-X message that a received communication flow element comprises. Communication flow division means 209 are used to divide a communication flow that is to be sent into at least two communication flow elements, and communication flow assembly means 210 are used to assemble received communication flow elements to form a joint communication flow. Agreement check means 207, assessment means 208, communication flow division means 209 and communication flow assembly means 210 are each in the form of a separate microprocessor with an appropriate software-based and hardware-based data processing structure.

Communication unit 202 comprises communication means 211, 212, 213 and 214. In this case, communication means 211 are in the form of WLAN communication means according to IEEE 802.11p, communication means 212 are in the form of HSDPA-capable mobile radio communication means with backward compatibility for UMTS links, communication means 213 are in the form of Bluetooth communication means and communication means 214 are in the form of infrared communication means. Since communication units 201 and 202 therefore have only WLAN communication means 203, 211 and mobile radio communication means 204, 212 as joint communication means, the communication between communication units 201 and 202 takes place only via WLAN communication means 203, 211 and mobile radio communication means 204, 212. In addition, communication unit 202 in microprocessor 215 comprises combined consistency check means for checking for consistency in redundantly received communication flow elements and assessment means for assessing a reliability of a vehicle-to-X message that a received communication flow element comprises. Microprocessor 216 is the likewise combined communication flow division means for dividing a communication flow that is to be sent into at least two communication flow elements and also communication flow assembly means for assembling received communication flow elements to form a joint communication flow. Since microprocessors 215 and 216 are therefore each assigned two different tasks, they have a higher computation capacity in comparison with microprocessors 207, 208, 209 and 210 in communication unit 201.

Figure 3:
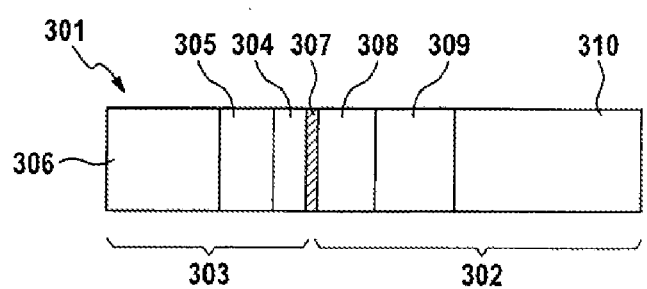
FIG. 3 shows a data structure for a vehicle-to-X message that a communication flow comprises.

FIG. 3 depicts a possible data structure for a vehicle-to-X message 301 that a communication flow comprises. Vehicle-to-X message 301 comprises security data portion 303 and useful data portion 302, which are separated from one another by characteristic bit string 307. Security data portion 303 comprises checksum 304, time stamp 305 and data integrity certificate 306 based on a central infrastructure. Hence, security data portion 303 comprises essential information that can be used by a receiver of vehicle-to-X message 301 to assess the authenticity and reliability of vehicle-to-X message 301. Useful data portion 302 for its part comprises initially GPS-coordinate-based position information 308 for the transmitter. In addition, useful data portion 302 comprises orientation and speed information 309 for the transmitter and also queue information 310. Queue information 310 states that the transmitter of vehicle-to-X message 301 has identified a queue end by means of vehicle-to-X communication means and camera sensors. Queue information 310 furthermore contains a piece of GPS-coordinate-based position information for the queue end and also a probability statement that describes the probability of the identified situation actually being a queue end on the basis of assessment by the transmitter.

While the above description constitutes the preferred embodiment of the present invention, it will be appreciated that the invention is susceptible to modification, variation, and change without departing from the proper scope and fair meaning of the accompanying claims.

The invention claimed is:

1. A method for the distributed transmission of a communication flow, the method comprising the steps of:
   unidirectionally communicating from a first to a second communication unit,
   transmitting between the first and second communication units via a communication flow by means of at least two different communication paths,
   wherein the communication flow comprises at least one vehicle-to-X message dividing into at least two communication flow elements by the first communication unit prior to sending to the second communication unit,
   transmitting from the first to the second communication unit in a manner distributed over the at least two different communication paths,
   assembling at least two communication flow elements by the second communication unit following reception by the second communication unit,
   checking by the second communication unit when assembling the at least two partial communication flows whether the at least two partial communication flows can be assembled to form a reliable joint communication flow by ascertaining whether the at least two partial communication flows correspond to the communication flow previously subdivided by the first communication unit,
   wherein the at least one vehicle-to-X message comprises a payload part and a security data part, and
   wherein the security data part comprises information on the assessment of the authenticity and reliability of the vehicle-to-X message by the receiver, and the payload part and the security data part are transmitted via respectively different communication paths of the at least two communication paths, wherein the joint communication flow is classified as reliable if the security data part is assignable to the payload part, and wherein the vehicle-to-X message is classified as unreliable if the security data part is not assignable to the payload part.

2. The method as claimed in claim 1, wherein the first and second communication units are each capable of bidirectional communication, wherein the bidirectional communication comprises two oppositely directed unidirectional communication flows, wherein for the bidirectional communication the first and second communication units each choose different communication paths for transmitting the unidirectional communication flow, and wherein for the bidirectional communication a unidirectional communication flow is not divided.

3. The method as claimed in claim 1, wherein the security data part comprises a checksum and/or a time stamp and/or a data integrity certificate, a data integrity certificate based on a central infrastructure.

4. The method as claimed in claim 1, further comprising the step of utilizing that the respective at least two different communication paths are used to redundantly transmit an identical communication flow element.

5. The method as claimed in claim 4, further comprising the steps of:
   checking the redundantly transmitted communication flow element for consistency, and
   classifying in the event of a discrepancy the redundantly transmitted communication flow element as unreliable.

6. The method as claimed in claim 1, further comprising the step of performing a reliability assessment based on a communication path.

7. The method as claimed in claim 1 further comprising the step of rejecting as unprocessed vehicle-to-X messages classified as not reliable.

8. The method as claimed in claim 1, further comprising the step of distributing over two different communication paths the at least two communication flow elements according to a prescribed scheme.

9. The method as claimed claim 1, wherein the respective at least two different communication paths are at least two different communication means and/or different communication channels of one and the same communication means.

10. A system for the distributed transmission of a communication flow, comprising:
    at least one first and a second communication unit that communicate with one another unidirectionally or bidirectionally,
    wherein the first and second communication units each comprise communication means and by means of the latter are capable of transmitting the communication flow by means of at least two different communication paths,
    wherein the first communication unit comprises communication flow subdividing means for subdividing a communication flow into at least two partial communication flows,
    wherein the second communication unit comprises communication flow assembling means for assembling the at least two partial communication flows to form a joint communication flow;
    wherein the second communication unit comprises assessing means for assessing a reliability of a vehicle-to-X message comprised by a received partial communication flow and also comparing means for comparing redundantly received partial communication flows,
    wherein the second communication unit is configured to check when assembling the at least two partial communication flows whether the at least two partial communication flows can be assembled to form a reliable joint communication flow by ascertaining whether the at least two partial communication flows correspond to the communication flow previously subdivided by the first communication unit,
    wherein the at least one vehicle-to-X message comprises a payload part and a security data part, and
    wherein the security data part comprises information on the assessment of the authenticity and reliability of the vehicle-to-X message by the receiver, and the payload part and the security data part are transmitted via respectively different communication paths of the at least two communication paths, wherein the joint communication flow is classified as reliable if the security data part is assignable to the payload part, and wherein the vehicle-to-X message is classified as unreliable if the security data part is not assignable to the payload part.

11. The system as claimed in claim 10, the communication means communicates on the basis of at least one of the following connection types:
    WLAN link,
    ISM (Industrial, Scientific, Medical band) link,
    Bluetooth link,
    ZigBee link,
    UWB (Ultra Wide Band) link,
    WiMax (Worldwide Interoperability for Microwave Access),
    Mobile radio link, and
    infrared link, wherein a mobile-radio-based communication means is associated with an automatic emergency call module.

* * * * *